United States Patent
Pena Placer et al.

(10) Patent No.: US 10,812,750 B2
(45) Date of Patent: Oct. 20, 2020

(54) ELECTRONIC DEVICE AND OPERATION METHOD THEREFOR

(71) Applicant: SAMSUNG ELECTRONICS CO., LTD., Suwon-si (KR)

(72) Inventors: Simon Pena Placer, Putney (GB); Christopher Alder, Wokingham (GB); Richard Moreton, Harpenden (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 15/773,012

(22) PCT Filed: Sep. 26, 2016

(86) PCT No.: PCT/KR2016/010731
§ 371 (c)(1),
(2) Date: May 2, 2018

(87) PCT Pub. No.: WO2017/086587
PCT Pub. Date: May 26, 2017

(65) Prior Publication Data
US 2018/0332251 A1    Nov. 15, 2018

(30) Foreign Application Priority Data
Nov. 17, 2015  (GB) .................................. 1520243.5

(51) Int. Cl.
*H04N 5/50* (2006.01)
*H04N 17/00* (2006.01)
(Continued)

(52) U.S. Cl.
CPC ............. *H04N 5/50* (2013.01); *H04N 17/004* (2013.01); *H04N 17/045* (2013.01);
(Continued)

(58) Field of Classification Search
CPC .. H04N 5/50; H04N 21/6582; H04N 21/6112; H04N 21/658; H04N 21/4383;
(Continued)

(56) References Cited

U.S. PATENT DOCUMENTS 6,333,765 B1    12/2001 Okada et al.
6,337,719 B1 *  1/2002 Cuccia ..................... H04N 5/50
(Continued)

FOREIGN PATENT DOCUMENTS

EP          2809075 A2    12/2014
KR   10-2006-0124069 A   12/2006
(Continued)

OTHER PUBLICATIONS

International Search Report dated Jan. 6, 2017, issued by the International Searching Authority in International Application No. PCT/KR2016/010731 (PCT/ISA/210).
(Continued)

*Primary Examiner* — Anthony Bantamoi
(74) *Attorney, Agent, or Firm* — Sughrue Mion, PLLC

(57) ABSTRACT

Provided is an electronic device including: a communication unit; a tuner configured to receive a channel signal of a broadcast channel by tuning to a frequency of the broadcast channel included in the broadcasting signal; and a controller configured to acquire data regarding the broadcast channel based on the channel signal and transmit the data to a server through the communication unit, the data including at least one of signal information indicating properties of the channel signal, and service information regarding the broadcast channel.

17 Claims, 7 Drawing Sheets

(51) Int. Cl.
*H04N 21/61* (2011.01)
*H04N 21/658* (2011.01)
*H04N 17/04* (2006.01)
*H04N 21/426* (2011.01)
*H04N 21/438* (2011.01)
*H04N 21/442* (2011.01)
*H04N 21/422* (2011.01)

(52) U.S. Cl.
CPC ..... *H04N 21/4263* (2013.01); *H04N 21/4383* (2013.01); *H04N 21/44209* (2013.01); *H04N 21/6112* (2013.01); *H04N 21/658* (2013.01); *H04N 21/6582* (2013.01); *H04N 21/42202* (2013.01)

(58) Field of Classification Search
CPC ............. H04N 21/4263; H04N 17/045; H04N 21/44209; H04N 17/004; H04N 21/42202; H04L 41/00
See application file for complete search history.

(56) References Cited

U.S. PATENT DOCUMENTS

| | | | |
|---|---|---|---|
| 8,750,804 B2 | 6/2014 | Zhang et al. | |
| 2002/0184653 A1* | 12/2002 | Pierce | H04N 7/16 |
| 2002/0199183 A1* | 12/2002 | Taniguchi | H04N 7/16 |
| 2003/0198200 A1* | 10/2003 | Diener | H04Q 7/00 |
| 2005/0114879 A1 | 5/2005 | Kamieniecki | |
| 2008/0107394 A1* | 5/2008 | Lee | H04N 5/93 |
| 2010/0284356 A1* | 11/2010 | Ray | H04W 40/00 |
| 2010/0302459 A1 | 12/2010 | Zhang et al. | |
| 2011/0319043 A1 | 12/2011 | Jackson et al. | |
| 2014/0101688 A1 | 4/2014 | Kim | |
| 2014/0307565 A1 | 10/2014 | Samarasooriya et al. | |
| 2014/0375823 A1* | 12/2014 | Lewis | H04N 17/004 |
| 2016/0191913 A1* | 1/2016 | Martch | H04N 17/04 |

FOREIGN PATENT DOCUMENTS

| | | |
|---|---|---|
| KR | 10-2014-0023515 A | 2/2014 |
| KR | 10-2014-0045205 A | 4/2014 |

OTHER PUBLICATIONS

Written Opinion dated Jan. 6, 2017, issued by the International Searching Authority in International Application No. PCT/KR2016/010731 (PCT/ISA/237).

Communication dated May 17, 2016, issued by the United Kingdom in counterpart United Kingdom Patent Application No. GB 1520243.5.

* cited by examiner

ELECTRONIC DEVICE AND OPERATION METHOD THEREFOR

TECHNICAL FIELD

The present disclosure relates to an electronic device including a tuner and a method of operating the electronic device, and more particularly, to an electronic device for obtaining, from broadcast signals received by a tuner, data regarding broadcast channels, and a method of operating the electronic device.

BACKGROUND ART

With developments in communication technology and multimedia, a broadcasting communication industry has rapidly developed. Properties of broadcast signals may be used for various purposes, for example, assignment of frequency bands of broadcast signals, determination of locations of repeater stations of broadcast signals, and the like. Since properties of the broadcast signals vary according to where they are measured, there is a demand for a method of effectively obtaining data regarding the properties of the broadcast signals.

DESCRIPTION OF EMBODIMENTS

Technical Problem

Provided are an electronic device for obtaining, from broadcast signals received by a tuner, data regarding broadcast channels, and a method of operating the electronic device.

BEST MODE

Figure 1:
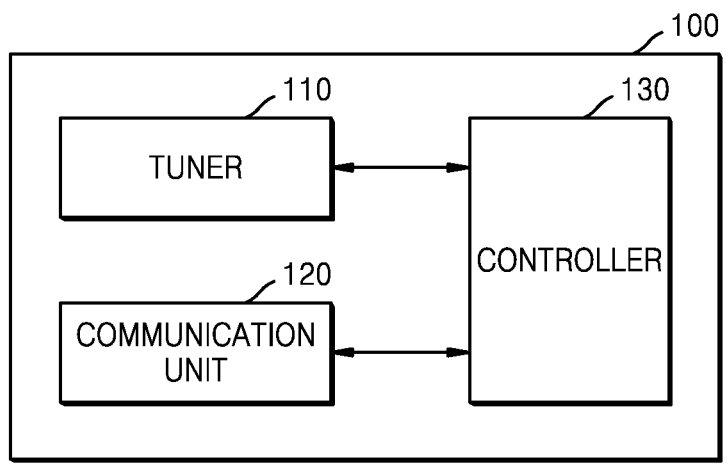
FIG. 1 is a block diagram of a structure of an electronic device, according to some embodiments.

According to one or more embodiments, an electronic device includes: a communication unit; a tuner configured to tune to a frequency of a broadcast channel included in a broadcast signal and receive a channel signal of the broadcast channel; and a controller configured to acquire data regarding the broadcast channel, based on the channel signal, and transmit the data to a server through the communication unit, the data including at least one of signal information indicating properties of the channel signal, and service information regarding the broadcast channel.

MODE OF DISCLOSURE

The terms used in the present specification will be briefly described before embodiments of the present disclosure will be described in detail.

The terms used in this specification are those general terms currently widely used in the art in consideration of functions regarding the present disclosure, but the terms may vary according to the intention of those of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the disclosure.

Throughout the specification, when a portion "includes" an element, another element may be further included, rather than excluding the existence of the other element, unless otherwise described. Also, the terms "unit", "module", etc. are units for processing at least one function or operation and may be implemented as hardware, software, or a combination of hardware and software.

The present disclosure will now be described more fully with reference to the accompanying drawings, in which embodiments of the present disclosure are shown. The present disclosure may, however, be embodied in many different forms and should not be construed as being limited to the embodiments set forth herein. For clarity, portions that are irrelevant to the descriptions of the disclosure are omitted from the drawings, and like reference numerals in the drawings denote like elements.

FIG. 1 is a block diagram of a structure of an electronic device 100, according to some embodiments.

Referring to FIG. 1, the electronic device 100 may include a tuner 110, a communication unit 120, and a controller 130. The electronic device 100 may be embodied as, for example, a television (TV), a personal computer (PC), a set-top box (STB), or the like. The electronic device 100 may be an electronic device or a computing device including a tuner to receive a channel signal in a certain frequency of a tuned broadcast signal.

The tuner 110 may receive a channel signal of a broadcast channel by tuning to a frequency of the broadcast channel included in a broadcast signal. The tuner 110 may be referred to as a TV tuner. The tuner 110 may tune only a frequency of a certain channel included in a broadcast signal that covers a wide frequency band and may select the tuned frequency. The tuner 110 may tune only a frequency of a certain channel by amplifying, mixing, resonating the broadcast signal.

The broadcast channel selected by the tuner 110 may be a broadcast channel (e.g., No. 506 on a cable TV) selected by a user. The electronic device 100 may further include a user input unit (not illustrated) for receiving a user input of selecting a broadcast channel. Alternatively, the electronic device 100 may receive a control signal indicating the broadcast channel from a controller such as a remote control via the communication unit 120. Alternatively, the tuner 110 may automatically select a broadcast channel according to a schedule programmed in advance.

The tuner 110 may receive a broadcast signal from various sources such as terrestrial broadcast, cable broadcast, satellite broadcast, Internet broadcast, and the like, in a wired or wireless manner. The tuner 110 may receive a broadcast signal from a source such as analog broadcast or digital broadcast.

A broadcast signal may include at least one of audio, video, and additional information. For example, additional information may include broadcast service information, program information, an electronic program guide (EPG), a subtitle corresponding to either audio or video, information associated with audio or video, or the like. However, the present disclosure is not limited thereto.

The controller 130 may separate the broadcast signal received by the tuner 110 into at least one of audio, video, and additional information by processing (e.g., demodulating, decoding, or the like) the channel signal received by the tuner 110. The controller 130 may process audio or video to be in a format reproducible in the electronic device 100 or an external device connected thereto. The tuner 110 may lock a specific broadcast channel in such a manner that the controller 130 processes the channel signal.

The electronic device 100 may further include an output unit that outputs audio or video included in the channel signal. The output unit may include an audio output unit that outputs audio, or a display that outputs video. For example, the electronic device 100 may be embodied as a TV.

Alternatively, the electronic device 100 may transmit audio or video to an external output device that is connected to the electronic device 100 in a wired or wireless manner and outputs video or audio. The output device may be an audio output device or a display device. The electronic device 100 may further include an input/output (I/O) interface to be connected to the output device. For example, the electronic device 100 may be embodied as a STB.

The communication unit 120 is a unit that enables communication with various types of external devices according to various communication methods such as a wired communication method or a wireless communication method.

The controller 130 may control overall operations of the electronic device 100. For example, the controller 130 may include at least one processor, a central processing unit (CPU), a microprocessor, a graphics processing unit (GPU), and the like. However, the present disclosure is not limited thereto.

The controller 130 may obtain data regarding a broadcast channel based on a channel signal corresponding to the broadcast channel received by the tuner 110. The data regarding the broadcast channel may include at least one of signal information indicating signal properties of the channel signal and service information (SI) regarding the broadcast channel.

The controller 130 may measure and analyze the channel signal received by the tuner 110 so as to acquire the signal information indicating the signal properties of the channel signal. The signal properties of the channel signal may include at least one of a signal strength, received signal strength indication (RSSI), signal quality, and a signal noise ratio (SNR). The RSSI may be a radio frequency (RF) signal level that is input by the tuner 110.

The SI regarding the broadcast channel may be viewing information regarding a broadcast channel that the user watches. The controller 130 may obtain the SI by monitoring the broadcast channel that the user watches, in addition to monitoring the channel signal received by the tuner 110. The controller 130 may obtain the SI from the additional information included in the channel signal of the broadcast channel received by the tuner 110. The SI may include at least one of the following or an arbitrary combination thereof. However, the present disclosure is not limited thereto.

TABLE 1

Service identifier
Service list
Broadcast channel identifier
Service name
Service LCN (Major)
Program genre
Program title
EPG A center frequency of the channel signal may be used as a broadcast channel identifier. The data regarding the broadcast channel may include at least one of the following or an arbitrary combination thereof. However, the present disclosure is not limited thereto.

TABLE 2

Electronic device identifier
Post code
Internet protocol (IP) address
Center frequency
Signal strength
Signal quality
Signal Noise Ratio C/N
Bit Error Rate BER
Uncorrected Packets
Tuner Lock Status
Physical Layer Pipes PLP
Digital Terrestrial Television (DTT) Interference in Band (co-channel interference; CCI)
Adjacent band DTT Interference (adjacent-channel interference; ACI)
T/T2 Mode
T2 System identifier
Date/time of capture
Frequency of capture/day
Monitoring Mode (Active/Passive)
TV input on high definition multimedia interface (HDMI)
TV input on direct-to-home (DTH)
Original network ID (ONID)
Transport stream ID (TSID)
Network ID Passive monitoring may be to obtain data regarding the broadcast channel when the electronic device 100 is being used. Passive monitoring may indicate that the electronic device 100 obtains data when the electronic device 100 is being used and no user action is required to obtain the data regarding the broadcast channel. In this case, the tuner 110 may receive the channel signal of the broadcast channel when the electronic device 100 is turned on. Therefore, when electronic device 100 is being used, the electronic device 100 may obtain the data regarding the broadcast channel. When the electronic device 100 is turned off or in a standby mode, the tuner 110 may not receive a channel signal. The standby mode may be an operation mode in which the electronic device 100 does not receive the channel signal, but waits to receive the channel signal. For example, in the standby mode, a screen of the electronic device 100 is turned off, or a standby mode screen may be displayed.

Active monitoring may be to obtain data regarding a broadcast signal over all frequency bands. The data regarding the broadcast signal may be analyzed on a server in order to check for signal interference, unexpected signals, noise, and the like. For example, the tuner 110 may receive the channel signal of the broadcast channel included in the broadcast signal when the electronic device 100 is turned on, and the tuner 110 may scan a frequency band of the broadcast signal when the electronic device 100 is in the standby mode. The electronic device 100 may obtain data regarding each broadcast channel included in the broadcast signal and may transmit the obtained data to the server.

The electronic device 100 may operate in a passive monitoring mode or an active monitoring mode.

Scanning all frequency bands of a broadcast signal is referred to as background scan. During background scan, the tuner 110 may scan the complete very high frequency (VHF)/ultra high frequency (UHF) range. For example, the tuner 110 may scan the VHF/UHF range from about 30 MHz (the VHF range) to about 900 MHz (the top of available UHF range). An RSSI level may be always returned to the controller 130. When a signal lock such as a DVB-T lock is effective, the SI may be returned.

The controller 130 may transmit the data regarding the broadcast channel to the server through the communication unit 120. The controller 130 may push the data regarding the broadcast channel to the server. Alternatively, the controller 130 may receive a request for the data regarding the broadcast channel from the server through the communication unit 120. In response to the request from the server, the controller 130 may transmit the data regarding the broadcast channel to the server.

The controller 130 may acquire the data regarding the broadcast channel whenever the broadcast channel is changed. Alternatively, the controller 130 may acquire the data regarding the broadcast channel at preset time intervals. The controller 130 may periodically acquire the data regarding the broadcast channel according to a preset cycle.

The controller 130 may transmit the data regarding the broadcast channel to the server in a preset transmission cycle. Alternatively, the controller 130 may periodically transmit the data regarding the broadcast channel to the server.

Before transmitting the data regarding the broadcast channel, the electronic device 100 may further include a storage unit for storing the data.

The controller 130 may receive configuration information indicating at least one of a data acquisition time of the data regarding the broadcast channel, a transmission time of the acquired data, a transmission cycle, and an information type to be included in the data, from the server through the communication unit 120. The configuration information may further indicate whether the electronic device 100 starts acquiring the data regarding the broadcast channel, how often the data has to be acquired, and the like. The controller 130 may acquire the data regarding the broadcast channel and transmit the data to the server at a defined transmission time, based on the configuration data.

The controller 130 may acquire location information of the electronic device 100 and may transmit the acquired location information to the server through the communication unit 120. A location of the electronic device 100 may be informed to the server in such a manner that the data regarding the broadcast channel which is transmitted by the electronic device 100 to the server may be valid.

The electronic device 100 may further include a position sensor (not illustrated) that detects the location of the electronic device 100. The position sensor may be a global positioning system (GPS) sensor, a global navigation satellite system (GNSS) sensor, or the like. The controller 130 may acquire the location information of the electronic device 100 by using the position sensor. For example, the controller 130 may acquire GNSS coordinates of the electronic device 100 by using the GNSS sensor.

Alternatively, the electronic device 100 may further include a user input unit (not illustrated) and may acquire the location information according to a user input received by the user input unit. For example, the user input unit may receive a user input corresponding to the location of the electronic device 100, for example, an address, a post code, or the like.

Alternatively, the controller 130 may acquire the location information of the electronic device 100 based on an IP address thereof. The electronic device 100 may be connected to a network by using the IP address and thus may receive digital content or software updates. The controller 130 may perform a process such as conversion or calculation on raw location information that is not processed, thereby acquiring the location information.

The controller 130 may transmit the data regarding the broadcast channel together with the location information to the server whenever the controller 130 transmits the data regarding the broadcast channel to the server. Alternatively, the controller 130 may transmit the location information together with an identifier of the electronic device 100 to the server once. In this case, the server may match the data regarding the broadcast channel, which is received from the electronic device 100, with the location of the electronic device 100 based on the location information that is received from the electronic device 100 once. The server may ensure that the location information of the electronic device 100 is valid based on the data regarding the broadcast channel that is received from the electronic device 100. For example, the location of the electronic device 100 may be valid by using the identifier of the electronic device 100.

Figure 2:
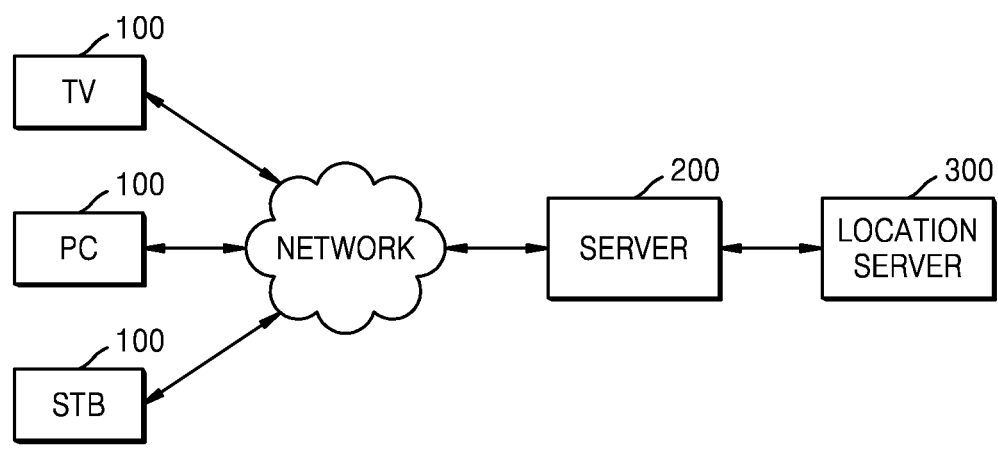
FIG. 2 is a schematic diagram for explaining a system including electronic devices and a server, according to some embodiments.

FIG. 2 is a schematic diagram for explaining a system including electronic devices 100 and a server 200, according to some embodiments.

Referring to FIG. 2, the server 200 may be connected to the electronic devices 100 via a network.

FIG. 2 illustrates that the electronic devices 100 are a TV, a PC, and an STB. However, the present disclosure is not limited thereto. The descriptions of the electronic device 100 which are provided with reference to FIG. 1 are applied to the electronic devices 100 of FIG. 2. Each electronic device 100 may receive a channel signal tuned by a tuner and may transmit, to the server 200, the data regarding the broadcast channel that is acquired based on the channel signal.

The server 200 may collect, process, and manage the data regarding the broadcast channel of each electronic device 100.

The server 200 may combine the data received from the electronic devices 100. The server 200 may anonymize the data received from each electronic device 100. An anonymizing process may be a process of identifying the electronic devices 100 from the data and deleting information used to identify the user of the electronic devices 100. The server 200 may combine the data received from the electronic devices 100 and anonymized.

The server 200 may combine the data received from the electronic devices 100 based on at least one of the broadcast channel and the location of each electronic device 100. The server 200 may combine the data received from the electronic devices 100

Alternatively, the server 200 may combine the data received from adjacent electronic devices 200 based on the location information of the electronic devices 100. The server 200 may combine data regarding each channel which is received from the electronic devices 100. Alternatively, the server 200 may combine data received from adjacent electronic devices 100 based on the location information of the electronic devices 100. The server 200 may combine data received from the electronic devices 100 in certain regions, based on the location information. Accordingly, the server 200 may generate average reading for a specified region.

The server 200 may compare the data received from the electronic devices 100 with data known for a geographical region and thus may validate current locations of the electronic devices 100.

When each electronic device 100 does not transmit the location information to the server 200, the server 200 may determine the locations of the electronic devices 100 based on the IP addresses of the electronic devices 100. The server 200 may transmit, to a location server 300, a request for retrieval of the location information based on the IP addresses. The location server 300 may transmit the location information to the server 200 in response to the request. The location server 300 may include a look-up table of the IP addresses and the locations. FIG. 2 illustrates that the location server 300 is separate from the server 200. However, the location server 300 may be integrated with the server 200.

The data processed in the server 200 may be variously used. The data processed in the server 200 may be used to identify reception blackspots and interference sources and thus may be used to determine locations of broadcast signal repeater stations. Also, the data processed in the server 200 may be used to detect white spaces. The white space is a frequency that is assigned to broadcast service, but is not used geographically.

The server 200 may allow third parties to use the data processed in the server 200. For example, the server 200 may provide collected data to spectrum policy developers, for example, the government. The spectrum policy developers may use the data collected by the server 200 when an available bandwidth is assigned. The server 200 may anonymize the data before the data is provided to the third parties.

The server 200 may transmit, to each electronic device 100, configuration information necessary for each electronic device 100 to transmit the data regarding the broadcast channel.

According to some embodiments, the electronic device 100 including the tuner transmits the data regarding the broadcast channel to the server, and the server 200 may effectively collect the data regarding the broadcast channel.

When some embodiments are not applied, a separate handheld reader or a specially adapted vehicle may be used to analyze broadcast signals. Measuring and analyzing the broadcast signals by using the handheld reader or the vehicle at every location where a broadcast signal receiver such as a TV is placed takes time and consumes energy, and thus are inefficient.

Figure 3:
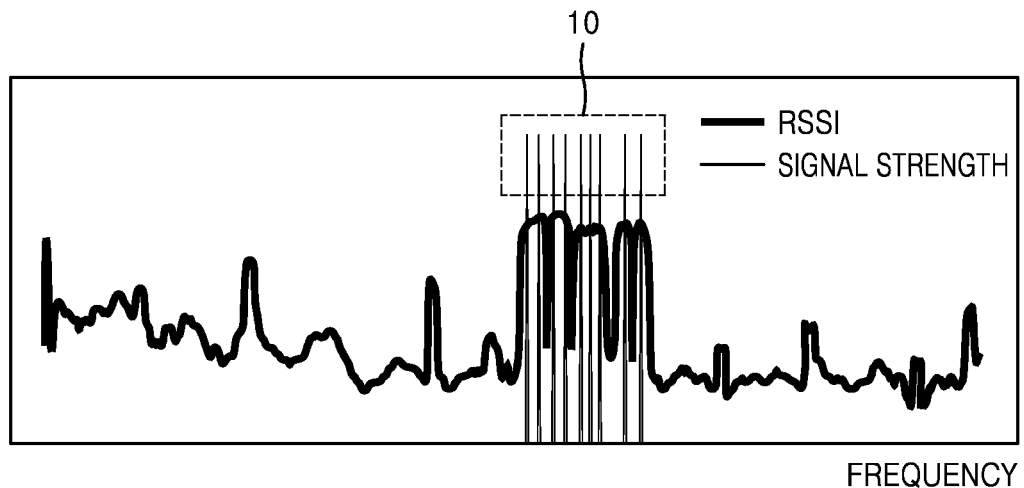
FIG. 3 is a graph showing an example of a signal strength and received signal strength indication (RSSI) according to a frequency of a broadcast signal.

FIG. 3 is a graph showing an example of a signal strength and RSSI according to a frequency of a broadcast signal.

Referring to FIG. 3, the broadcast signal covers a wide frequency band. Peaks 10 appear at the signal strength of the broadcast signal. The peaks 10 correspond to broadcast channels that the tuner may tune.

Figure 4:
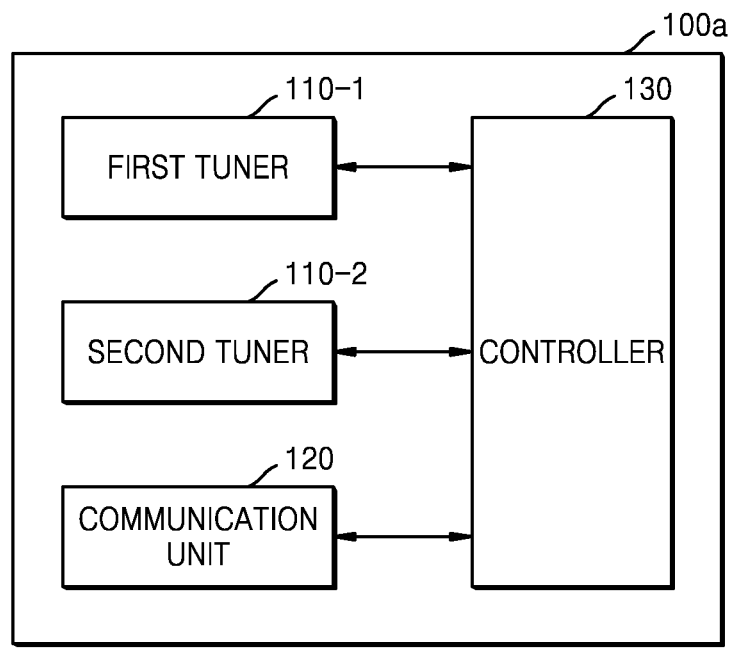
FIG. 4 is a block diagram of a structure of an electronic device including tuners, according to some embodiments.

FIG. 4 is a block diagram of a structure of an electronic device 100*a* including tuners, according to some embodiments.

Referring to FIG. 4, the electronic device 100*a* may include a first tuner 110-1, a second tuner 110-2, the communication unit 120, and the controller 130. The electronic device 100*a* of FIG. 4 is the same as the electronic device 100 of FIG. 1 except that the electronic device 100*a* includes the first tuner 110-1 and the second tuner 110-2. Therefore, the descriptions of the electronic device 100 that are provided with reference to FIGS. 1 to 3 may be applied to the electronic device 100*a*, and thus repeated descriptions will be omitted herein.

FIG. 4 illustrates that the electronic device 100*a* includes the first tuner 110-1 and the second tuner 110-2, but the number of tuners included in the electronic device 100*a* of FIG. 4 is not limited thereto.

The first tuner 110-1 may receive a channel signal of a broadcast channel that the electronic device 100*a* or an output device connected to the electronic device 100*a* desires to output.

The second tuner 110-2 may receive a channel signal of a broadcast channel that is the same as or different from the broadcast channel received by the first tuner 110-1. The controller 130 may acquire data regarding the broadcast channel based on the channel signal received by the second tuner 110-2 and may transmit the data to the server through the communication channel 120.

The second tuner 110-2 may scan a frequency band of the broadcast signal. That is, the second tuner 110-2 may perform background scan. The controller 130 may acquire data regarding each broadcast channel included in the broadcast signal and may transmit the acquired data to the server. The electronic device 100*a* may perform active monitoring through the second tuner 110-2.

Figure 5:
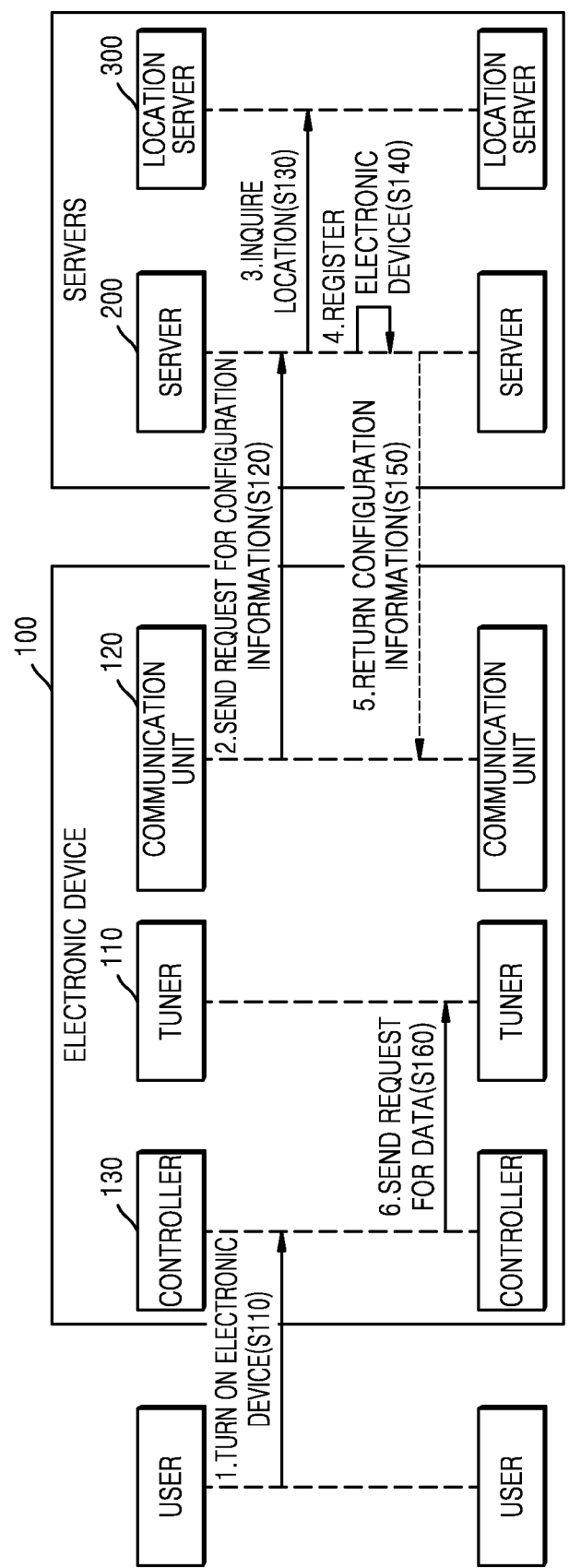
FIG. 5 illustrates a process in which an electronic device and a server perform initial configuration, according to some embodiments.

FIG. 5 illustrates a process in which the electronic device 100 and the server 200 perform initial configuration, according to some embodiments.

Referring to FIG. 5, in operation S110, the electronic device 100 may be turned on by the user. The electronic device 100 may receive a user input of turning on the electronic device 100 through the user input unit of the electronic device 100. Alternatively, the electronic device 100 may receive a control signal for controlling the electronic device 100 to be turned on, from a controller such as TV remote control through the communication unit 120. When the electronic device 100 is turned on, the electronic device 100 may perform handshaking together with the server 200. Handshaking may be a process whereby a communication connection between the electronic device 100 and the server 200 is established.

In operation S120, the electronic device 100 may send a request for the configuration information to the server 200. The configuration information may include various configurations necessary for the electronic device 100 to acquire the data regarding the broadcast channel and transmit the data regarding the broadcast channel to the server 200. For example, the configuration information may indicate at least one of a data acquisition time of the data regarding the broadcast channel, a data transmission time, and a type of information to be included in the data.

In operation S130, the server 200 may inquire the location of the electronic device 100 of the location server 300. When the server 200 is not able to identify the location of the electronic device 100, the server 200 may inquire the location of the electronic device 100 of the location server 300. For example, the server 200 may inquire, of the location server 300, the location of the electronic device 100 corresponding to the IP address of the electronic device 100. The location server 300 may acquire the location information of the electronic device 100 corresponding to the IP address and may transmit the acquired location information to the server 200.

Alternatively, the electronic device 100 may transmit the location information of the electronic device 100 to the server 200, and the server 200 may identify the location of the electronic device 100 based on the received location information.

In operation S140, the server 200 may register the electronic device 100. The server 200 may store the identifier of the electronic device 100 in a storage unit of the server 200 and thus may register the electronic device 100. The server 200 may match the identifier of the electronic device 100 with the location thereof and may store the same in the storage unit of the server 200. In this case, the server 200 does not need to inquire the location of the electronic device 100 of the location server 300 whenever the data regarding the broadcast channel is received from the electronic device 100. The server 200 may match the data regarding the broadcast channel, which is received according to time, with the identifier and the location of the electronic device 100 and may store the data regarding the broadcast channel in the storage unit of the server 200.

In operation S150, the server 200 may return the configuration information to the electronic device 100 in response to the request for the configuration information that is made in operation S120. The configuration information may include default values indicating whether the electronic device 100 starts acquiring the data regarding the broadcast channel, how often the data regarding the broadcast channel has to be acquired when the electronic device 100 starts acquiring the data regarding the broadcast channel, a type of information to be included in the data regarding the broadcast channel, and the like. For example, based on the default values, the electronic device 100 may collect one sample a day, the sample being associated with each of tuned broadcast channels.

In operation S160, the controller 130 of the electronic device 100 may acquire the data regarding the broadcast channel by sending a request for the data to the tuner 110. The controller 130 may acquire the data regarding the broadcast channel based on the channel signal received by the tuner 110.

Figure 6:
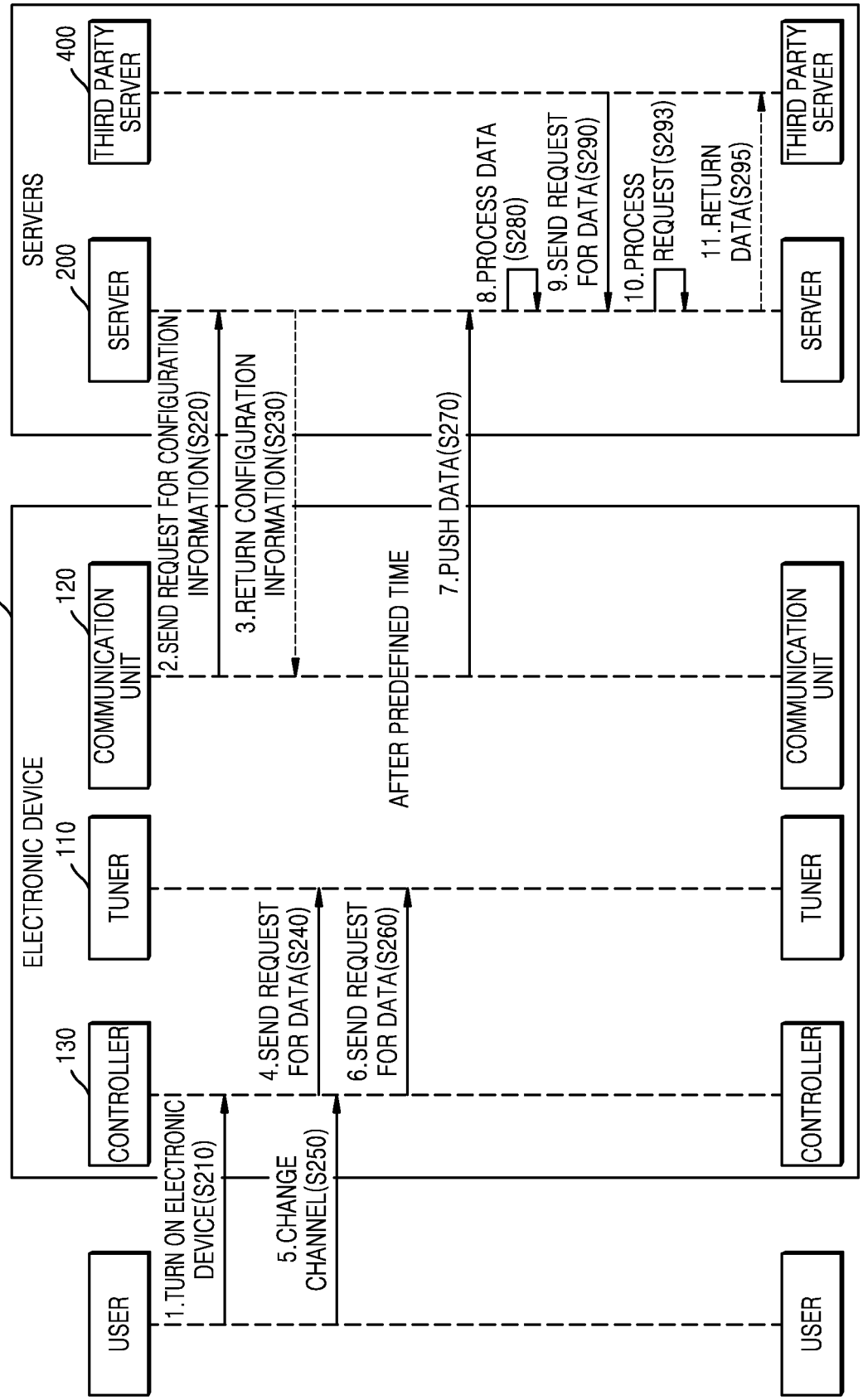
FIG. 6 illustrates a process in which an electronic device obtains data regarding a broadcast channel whenever the broadcast channel is changed, according to some embodiments.

FIG. 6 illustrates a process in which the electronic device 100 acquires data regarding a broadcast channel whenever the broadcast channel is changed, according to some embodiments.

Referring to FIG. 6, in operation S210, the electronic device 100 may be turned on by the user. In operation S220, the electronic device 100 may send a request for the configuration information to the server 200, and in operation S230, the server 200 may return the configuration information to the electronic device 100 in response to the request for the configuration information. Operations S210 to S230 correspond to operations S110, S120, and S150 of FIG. 4, respectively, and thus repeated descriptions will be omitted herein.

The configuration information may include a configuration value that, whenever the broadcast channel is changed, indicates that data regarding the changed broadcast channel is to be acquired. The configuration information may further include a transmission cycle of the data regarding the broadcast channel.

In operation S240, the controller 130 may acquire the data regarding the broadcast channel by sending the request for the data to the tuner 110. The controller 130 may acquire the data regarding the broadcast channel according to the channel signal received by the tuner 110. The storage unit of the electronic device 100 may store the data regarding the broadcast channel.

In operation S250, the user may change the broadcast channel by using the controller 130 of the electronic device 100. The electronic device 100 may receive a user input of changing of a broadcast channel by using the user input unit of the electronic device 100. Alternatively, the electronic device 100 may receive a control signal indicating a change of a broadcast channel from a control device such as remote control through the communication unit 120. Alternatively, the electronic device 100 may automatically change a broadcast channel according to a schedule that is programmed in advance.

The tuner 110 may receive a channel signal of the broadcast channel that is changed by tuning to a frequency of the changed broadcast channel. The output unit in the electronic device 100 or an external output unit connected to the electronic device 100 may output audio or video of the changed broadcast channel.

In operation S260, the controller 130 may acquire the data regarding the changed broadcast channel. The controller 130 may acquire the data regarding the changed broadcast channel that is tuned by the tuner 110 whenever broadcast channels are changed. Alternatively, when the tuner 110 tunes the broadcast channel, the controller 130 may acquire data regarding the tuned broadcast channel.

The storage unit of the electronic device 100 may store the data regarding the changed broadcast channel. The controller 130 may add/combine the data regarding the changed broadcast channel which is newly acquired in operation S260 to/with data regarding a previous broadcast channel which is acquired in operation S240.

In operation S270, the electronic device 100 may transmit, to the server 200, data regarding each broadcast channel changed through the communication unit 120. The electronic device 100 may push, to the server 200, acquired data regarding broadcast channels that are changed after a predefined time, based on the configuration information that is returned in operation S230. For example, the electronic device 100 may transmit the data to the server 200 once per hour or day.

In operation S280, the server 200 may anonymize the received data regarding the broadcast channels. The anonymized data may be transmitted to a third party server 400.

In operation S290, the third party server 400 may send a request for the data regarding the broadcast channel to the server 200. The request may include information regarding properties of data that is necessary for the third party server 400. For example, the third party server 400 may require only data associated with a certain geographical region or a certain broadcast channel and may include, in the request, information indicating the certain geographical region or the certain broadcast channel.

In operation S293, the server 200 may process the data regarding the broadcast channel in response to the request, and in operation S295, the server 200 may transmit the processed data to the third party server 400.

The electronic device 100 may acquire the data regarding the broadcast channel from a background in which the user uses the electronic device 100. Operations of FIG. 6 are passive monitoring processes using minimal samples.

Figure 7:
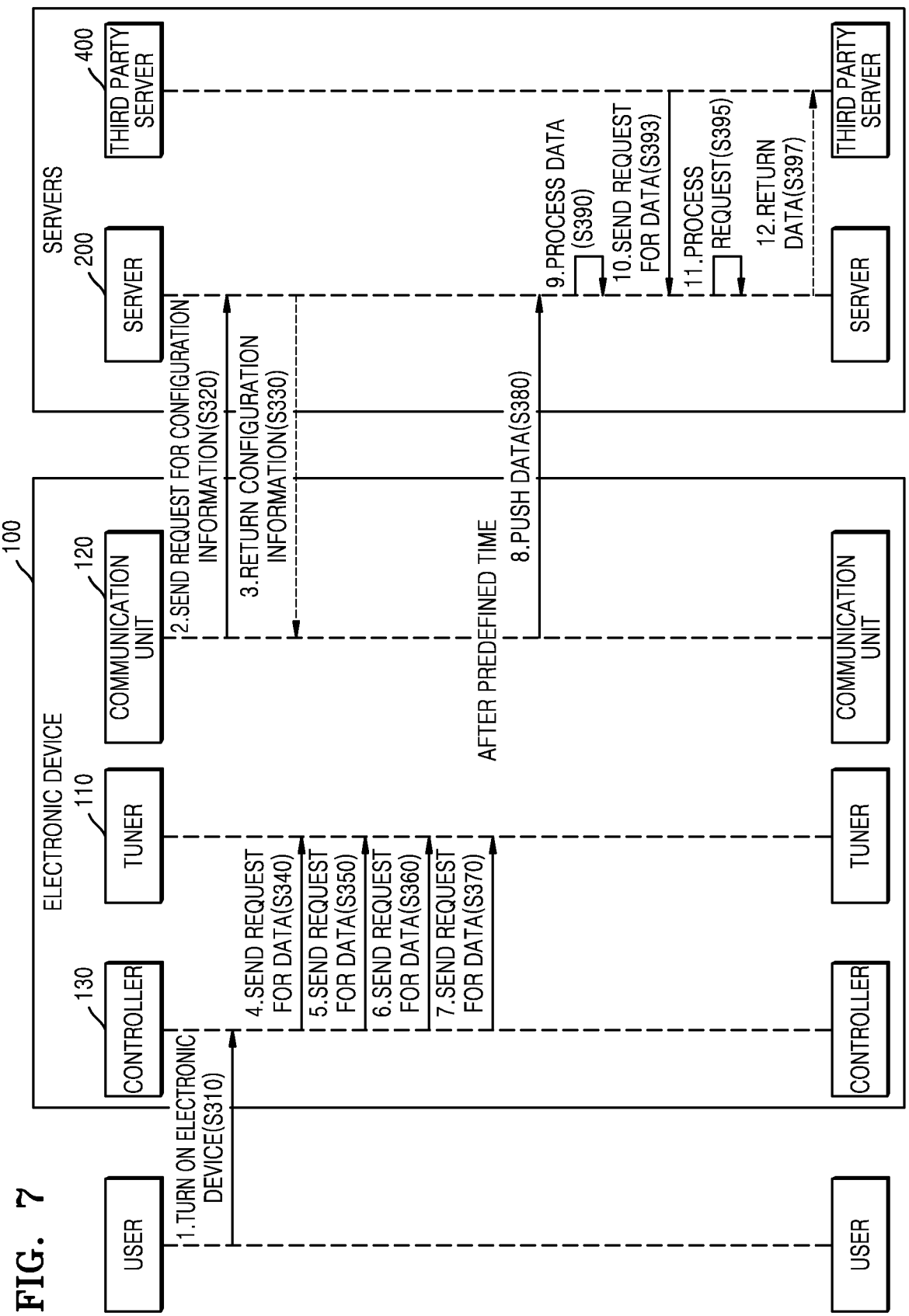
FIG. 7 illustrates a process in which an electronic device periodically acquires data regarding a broadcast channel, according to some embodiments.

FIG. 7 illustrates a process in which the electronic device 100 periodically acquires data regarding a broadcast channel, according to some embodiments.

The electronic device 100 of FIG. 6 may acquire the data regarding the broadcast channel whenever the broadcast channel is changed, while the electronic device 100 of FIG.

7 may acquire the data regarding the broadcast channel according to a preset cycle regardless of a change of the broadcast channel.

Referring to FIG. 7, in operation S310, the electronic device 100 may be turned on by the user. In operation S320, the electronic device 100 may send a request for configuration information to the server 200, and in operation S330, the server 200 may return the configuration information to the electronic device 100 in response to the request for the configuration information. The configuration information, which is returned by the server 200 to the electronic device 100 in operation S330, may include a cycle of acquiring the data regarding the broadcast channel. For example, the cycle may be every 10 minutes.

In operations S340 to S370, the electronic device 100 may periodically acquire the data regarding the broadcast channel. Except that the electronic device 100 periodically acquires the data, a process of acquiring the data in FIG. 7 is the same as the process in FIG. 6, and thus repeated descriptions will be omitted herein.

FIG. 7 illustrates a periodical passive monitoring process. A difference between the embodiment of FIG. 7 and the embodiment of FIG. 6 is that, according to the process of FIG. 7, the data regarding the broadcast channel is acquired regardless of whether the user inputs a command for changing a broadcast channel that the user is watching.

Figure 8:
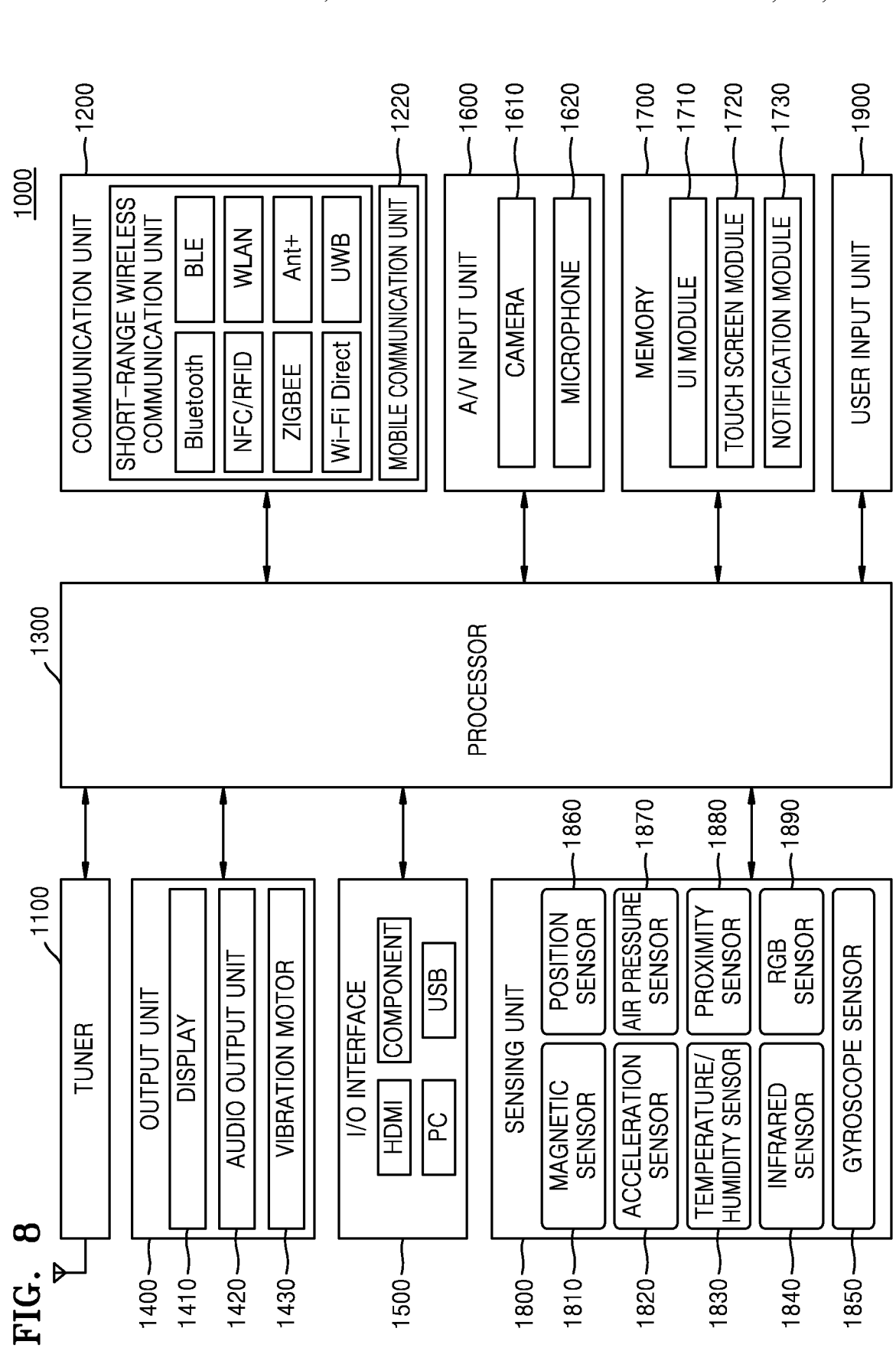
FIG. 8 is a block diagram of a structure of an electronic device, according to some embodiments.

FIG. 8 is a block diagram of a structure of an electronic device 1000, according to some embodiments. The electronic device 1000 of FIG. 8 may be an example of the electronic device 100 of FIG. 1.

Referring to FIG. 8, the electronic device 1000 may include a tuner 1100, a communication unit 1200, and a processor 1300. The electronic device 1000 may further include an output unit 1400, an input/output (I/O) interface 1500, an Audio/Video (A/V) input unit 1600, a memory 1700, a sensing unit 1800, and a user input unit 1900.

However, not every component illustrated in FIG. 8 is necessary for the electronic device 1000. The electronic device 1000 may be realized by more or less components than the components illustrated in FIG. 8.

The descriptions of the tuner 1100, the communication unit 1200, and the processor 1300 are provided with reference to FIGS. 1 to 7 and thus will not be repeated.

The tuner 1100 may receive a channel signal of a broadcast channel by tuning to a frequency of the broadcast channel included in a broadcast signal. The channel signal received by the tuner 1100 may be decoded (for example, audio decoding, video decoding, or additional information decoding) and thus may be divided into audio, video, and/or additional information. The audio, the video, and/or the additional information may be stored in the memory 1700 according to the control of the processor 1300.

The tuner 1100 of the electronic device 1000 may be provided in singular or plural. The tuner 1100 may be integrated with the electronic device 1000 or embodied as a tuner (not illustrated) connected to the I/O interface 1500 or a separate device (e.g., an STB (not illustrated)) including a tuner electrically connected to the electronic device 1000.

The communication unit 1200 may connect the electronic device 1000 to an external device, an external server, or the like according to the control of the processor 1300. The communication unit 1200 may include at least one component that enables communication with the server 200. For example, the communication unit 1200 may include a short-range wireless communication unit 1210 and a mobile communication unit 1220.

The short-range wireless communication unit 1210 may include a Bluetooth communication unit, a Bluetooth Low Energy (BLE) communication unit, a near field communication unit, a WLAN (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, etc. However, the present disclosure is not limited thereto.

The mobile communication unit 1220 transceives a wireless signal with at least one of a base station, an external terminal, and a server in a mobile communication network. The wireless signal may include various types of data according to transceiving of a voice call signal, a video call signal, or a text/multimedia message.

The processor 1300 controls overall operations of the electronic device 1000 and signal flow between components within the electronic device 1000 and processes data. When there is a user input or a predetermined condition is satisfied, the processor 1300 may execute at least one instruction, a program, an operation system (OS), and various applications which are stored in the memory 1700.

The processor 1300 may acquire the data regarding the broadcast channel based on the channel signal of the broadcast channel included in the broadcast signal received by the tuner 1100. The processor 1300 may transmit the data regarding the broadcast channel to the server.

The processor 1300 may acquire the data regarding the broadcast channel whenever the broadcast channel is changed or may periodically acquire the data.

The processor 1300 may acquire location information of the electronic device 1000 and transmit the location information to the server through the communication unit 1200. The processor 1300 may acquire the location information through a position sensor 1860. The processor 1300 may acquire the location information based on the user input received through the user input unit 1900.

The processor 1300 may receive configuration information indicating at least one of an acquisition time of the data regarding the broadcast channel, a transmission time of the data, and a type of information to be included in the data, from the server through the communication unit 1200.

The output unit 1400 may output video, audio, or vibrations and may include a display 1410, an audio output unit 1420, and a vibration motor 1430.

The display 1410 may output video. The display 1410 may display, on a screen, video included in the channel signal received by the tuner 1100, according to the control of the processor 1300. Also, the display 1410 may display content (e.g., video) which is input through the communication unit 1200 or the I/O interface 1500. The display 1410 may output video stored in the memory 1700 according to the control of the processor 1300. Moreover, the display 1410 may display a voice user interface (UI) (e.g., a voice UI including a voice instruction guide) for performing a voice recognition task corresponding to voice recognition, or a motion UI (e.g., a motion UI including a user motion guide for motion recognition) for performing a motion recognition task corresponding to motion recognition.

When the display 1410 and a touchpad form a touch screen in a layer structure, the display 1410 may be used as an input device in addition to an output device. The display 1410 may include at least one of a liquid crystal display, a thin film transistor-liquid crystal display, an organic light-emitting diode, a flexible display, a three-dimensional (3D) display, and an electrophoretic display. According to an implementation form of the electronic apparatus 1000, the electronic apparatus 1000 may include two or more displays as the display 1410. The two or more displays 1410 may be arranged to face each other by using a hinge.

The audio output unit 1420 may output audio. The audio output unit 1420 may output audio included in the channel signal received by the tuner 1100, according to the control of the processor 1300. The audio output unit 1420 may output audio (e.g., voice, sound, etc.) which is input through the communication unit 1200 or the I/O interface 1500. Also, the audio output unit 1420 may output audio stored in the memory 1700 according to the control of the processor 1300. The audio output unit 1420 may include a speaker, a buzzer, a headphone output terminal, a Sony/Philips Digital Interface (S/PDIF) output terminal, or the like.

The vibration motor 1430 may output a vibration. For example, the vibration motor 1430 may output a vibration corresponding to an output of video or audio (e.g., call signal receiving sound, message receiving sound, etc.). Also, the vibration motor 1430 may output a vibration when a touch is input on a touch screen.

The I/O interface 1500 may output video, audio, additional information, and the like, which are included in the channel signal received by the tuner 1100, to an external device (e.g., an output device) of the electronic device 1000, according to the control of the processor 1300. Alternatively, the I/O interface 1500 may receive, from the external device, video (e.g., a moving image, etc.), audio (e.g., voice, music, etc.), additional information (e.g., an electronic program guide (EPG), etc.), and the like. The I/O interface 1500 may include one or a combination of a High-Definition Multimedia Interface port (HDMI) port, a component jack, a PC port, and a universal serial bus (USB) port.

The A/V input unit 1600 is used to input audio or video and may include a camera 1610, a microphone 1620, etc.

The camera 1610 may receive an image (e.g., continuous frames) corresponding to a motion of a user that includes a gesture within a camera recognition range. The processor 1300 may use a received recognition result of the motion so as to select a menu displayed on the electronic device 1000 or perform control corresponding to the recognition result. For example, control based on a gesture may include turning on of the electronic device 1000, selection of a broadcast channel, volume adjustment, indicator movement, cursor movement, or the like.

Also, the camera 1610 may capture and acquire images such as still or moving images. The images acquired by the camera 1610 may be processed by the processor 1300 or a separate image processor (not shown).

The images processed by the camera 1610 may be stored in the memory 1700 or transmitted to an external device through the communication unit 1200. Two or more cameras may be provided as the camera 1610 according to configurations of a terminal.

The microphone 1620 receives an input of an external audio signal and processes the input into an electrical signal. For example, the microphone 1620 may receive an audio signal from the external device or a speaker. The microphone 1620 may use various noise removal algorithms to remove noise generated while the external audio signal is input. According to an embodiment, a user input corresponding to turning on of the electronic device 1000, broadcast channel selection, volume adjustment, or the like may be received through the microphone 1620.

The memory 1700 may store commands for processing and controlling the processor 1300, data, programs, applications, etc. and may store data that is input to or output from the electronic device 1000. The memory 1700 may store signals or data that is input/output corresponding to operations of the tuner 1100, the communication unit 1200, the processor 1300, the output unit 1400, the I/O interface 1500, the A/V input unit 1600, the sensing unit 1800, and the user input unit 1900.

The memory 1700 may include at least one storage medium from among a flash memory-type storage medium, a hard disk-type storage medium, a multimedia card microtype storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disc, and an optical disc.

The programs stored in the memory 1700 may be classified into modules according to functions thereof. For example, the programs may be classified into a UI module 1710, a touch screen module 1720, and a notification module 1730.

The UI module 1710 may provide a specialized UI or GUI which interoperates with the electronic device 1000 according to applications. The touch screen module 1720 may detect a user's touch gesture on the touch screen and may transmit information related to the touch gesture to the processor 1300. The touch screen module 1720 may recognize and analyze touch codes. The touch screen module 1720 may be embodied as separate hardware including a controller.

The notification module 1730 may generate a signal for notifying the occurrence of events on the electronic device 1000. Examples of events occurring on the electronic device 1000 may be call signal reception, message reception, key signal reception, a schedule notification, and the like. The notification module 1730 may output a notification signal in a video form through the display 1410, in an audio form through the audio output unit 1420, or in a vibration form through the vibration motor 1430.

The sensing unit 1800 may detect a state of the electronic device 1000 or a state near the electronic device 1000 and may transmit the detected state to the processor 1300.

The sensing unit 1800 may include at least one of a magnetic sensor 1810, an acceleration sensor 1820, a temperature/humidity sensor 1830, an infrared sensor 1840, a gyroscope sensor 1850, a position sensor (e.g., a global positioning system (GPS)) 1860, an air pressure sensor 1870, a proximity sensor 1880, and an RGB sensor (i.e., an illumination sensor) 1890. However, the sensing unit 1800 is not limited thereto. Functions of respective sensors may be intuitively inferred by one of ordinary skill in the art, and thus detailed descriptions thereof will be omitted.

The user input unit 1900 may be a unit by which the user inputs commands for controlling the electronic device 1000. For example, the user input unit 1900 may include a key pad, a dome switch, a touch pad (a touch capacitive-type touch pad, a pressure resistive-type touch pad, an infrared beam sensing-type touch pad, a surface acoustic wave-type touch pad, an integral strain gauge-type touch pad, a Piezoelectric effect-type touch pad, or the like), a jog wheel, a jog switch, or the like. However, the present disclosure is not limited thereto.

The user input unit 1900 may receive a user input of selecting a broadcast channel, a user input indicating location information of the electronic device 1000, and the like.

Figure 9:
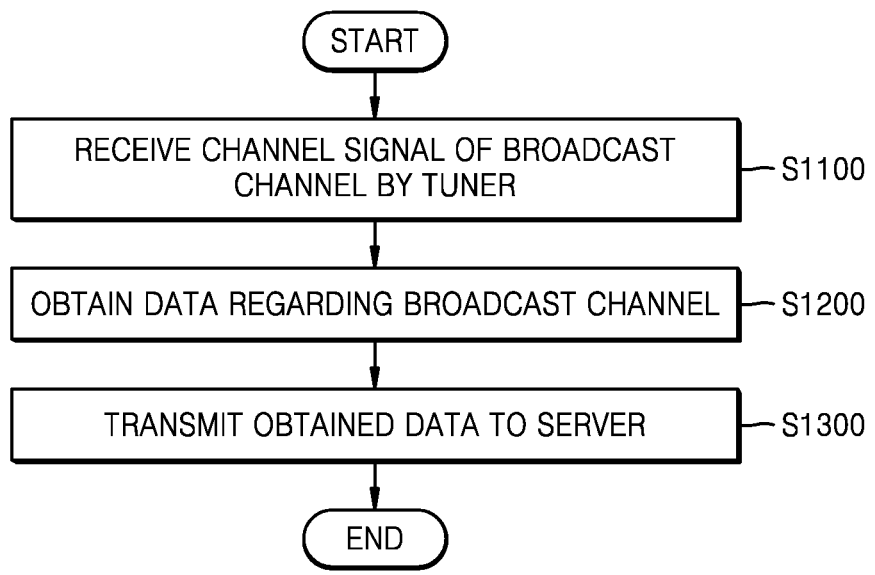
FIG. 9 is a flowchart of a method of operating an electronic device, according to some embodiments.

FIG. 9 is a flowchart of a method of operating an electronic device, according to some embodiments.

Referring to FIG. 9, in operation S1100, the electronic device may use a tuner included in the electronic device so as to receive a channel signal of a broadcast channel by tuning to a frequency of the broadcast channel included in a broadcast signal.

In operation S1200, the electronic device may acquire data regarding the broadcast channel based on the channel signal, the data including at least one of signal information indicating properties of the channel signal and SI regarding the broadcast channel. In operation S1130, the electronic device may transmit the acquired data to the server. The data regarding the broadcast channel may include at least one of a strength of the channel signal, quality of the channel signal, an SNR of the channel signal, and an identifier of the broadcast channel.

The electronic device may acquire the data regarding the broadcast channel whenever the broadcast channel is changed or may periodically acquire the data.

The electronic device may acquire location information of the electronic device or transmit the location information to the server. The electronic device may acquire the location information through the position sensor included in the electronic device or based on a user input received by the user input unit included in the electronic device.

The electronic device may scan a frequency band of broadcast signals by using another tuner included in the electronic device. The electronic device may acquire data regarding respective broadcast channels included in the broadcast signals and may transmit the data regarding the broadcast channels to the server.

The electronic device may output audio and video included in the channel signal of the broadcast channel through the output unit included in the electronic device, or may transmit the video or audio to an external output device.

The electronic device may receive configuration information indicating at least one of an acquisition time of the data regarding the broadcast channel, a transmission time of the data, and a type of information to be included in the data.

When the electronic device is turned on, the electronic device may receive a channel signal included in the broadcast signal via the tuner. When the electronic device is in a standby mode, the electronic device may scan the frequency band of the broadcast signals via the tuner.

The method of FIG. 9 may be performed by the electronic devices 100 and 1000 described with reference to FIGS. 1 to 8. Therefore, the descriptions provided above may be applied to the method of FIG. 9, and repeated descriptions will be omitted herein.

Some embodiments may be embodied in a form of a recording medium including instructions executable by a computer such as a program module executable by a computer. A non-transitory computer-readable recording medium may be an arbitrary medium that can be accessed by a computer and include volatile and non-volatile media and removable and non-removable media. Also, the non-transitory computer-readable recording medium may include both a computer storage medium and a communication medium. The computer storage medium includes volatile and non-volatile media and removable and non-removable media implemented by an arbitrary method or technology for storing information such as computer-readable instructions, data structures, program modules, or other types of data. The communication medium typically includes computer-readable instructions, data structures, program modules, data of a modulated data signal, or other transmission mechanisms and includes an arbitrary information transmission medium.

The scope of the present disclosure is defined not by the detailed description of the disclosure but by the appended claims, and all changes and modifications introduced from the concept and scope of the claims and the equivalent concept thereof will be construed as being included in the present disclosure.

The invention claimed is:

1. An electronic device comprising:
a communication interface;
a tuner configured to tune to a frequency of a broadcast channel included in a broadcast signal, receive a channel signal of the broadcast channel when the electronic device is turned on, and scan frequency bands of the broadcast signal when the electronic device is in a standby mode; and
at least one processor configured to:
obtain configuration information from a server through the communication interface, the configuration information indicating an acquisition time of data regarding the broadcast channel by the electronic device and a transmission time of the data from the electronic device to the server;
based on the acquisition time of the data, obtain the data regarding the broadcast channel based on the channel signal; and
based on the transmission time of the data, transmit the data to the server through the communication interface, the data including at least two of a strength of the channel signal, a quality of the channel signal, a signal to noise ratio (SNR) of the channel signal, or a broadcast channel identifier, wherein the at least one processor is further configured to, based on the transmission time of the data, transmit, to the server, the data obtained by the tuner by scanning the frequency bands of the broadcast signal in the standby mode, such that the server is capable of analyzing the data obtained by the tuner in the standby mode, over all of the frequency bands of the broadcast channel.

2. The electronic device of claim 1, wherein the at least one processor is further configured to obtain the data whenever the broadcast channel is changed or obtain the data periodically.

3. The electronic device of claim 1, wherein the at least one processor is further configured to obtain location information of the electronic device and transmit the location information to the server through the communication interface.

4. The electronic device of claim 3, further comprising a position sensor or a user input interface, implemented by hardware,
wherein the at least one processor is further configured to obtain the location information through the position sensor or based on a user input received through the user input interface.

5. The electronic device of claim 1, further comprising another tuner configured to scan a frequency band of the broadcast signal,
wherein the at least one processor is further configured to obtain data regarding each of a plurality of broadcast channels included in the broadcast signal and transmit the data regarding each of the plurality of broadcast channels to the server through the communication interface.

6. The electronic device of claim 1, further comprising a display configured to output video or audio included in the channel signal of the broadcast channel, or an input/output port configured to transmit the video or the audio to an output device configured to output the video or the audio.

7. The electronic device of claim 1, wherein the configuration information further indicates a type of information to be included in the data.

8. The electronic device of claim 1, further comprising a user input interface, implemented by hardware,
wherein the at least one processor is further configured to receive a user input of selecting the broadcast channel through the user input interface, or receive, through the communication interface, a control signal indicating the broadcast channel from a control device external to the electronic device.

9. A method of operating an electronic device, the method comprising:
receiving, by a tuner of the electronic device, a channel signal of a broadcast channel by tuning to a frequency of the broadcast channel included in a broadcast signal when the electronic device is turned on;
scanning frequency bands of the broadcast signal through the tuner when the electronic device is in a standby mode;
obtaining, by at least one processor of the electronic device, configuration information from a server, the configuration information indicating an acquisition time of data regarding the broadcast channel by the electronic device and a transmission time of the data from the electronic device to the server;
based on the acquisition time of the data, obtaining, by the at least one processor, the data regarding the broadcast channel based on the channel signal, the data including at least two of a strength of the channel signal, a quality of the channel signal, a signal to noise ratio (SNR) of the channel signal, or a broadcast channel identifier; and
based on the transmission time of the data, transmitting the data to the server, the transmitting comprises transmitting the data obtained by the tuner by scanning the frequency bands of the broadcast signal in the standby mode, such that the server is capable of analyzing the data obtained by the tuner in the standby mode, over all of the frequency bands of the broadcast channel.

10. The method of claim 9, wherein the data is obtained whenever the broadcast channel is changed or is obtained periodically.

11. The method of claim 9, further comprising:
obtaining location information of the electronic device; and
transmitting the location information to the server.

12. The method of claim 11, wherein the location information is obtained through a position sensor of the electronic device or based on a user input received through a user input interface, implemented by hardware, of the electronic device.

13. The method of claim 9, further comprising:
scanning a frequency band of the broadcast signal by using another tuner of the electronic device;
obtaining data regarding each of a plurality of broadcast channels included in the broadcast signal; and
transmitting the data regarding each of the plurality of broadcast channels to the server.

14. The method of claim 9, further comprising:
outputting video and audio included in the channel signal of the broadcast channel through a display of the electronic device; or
transmitting the video and the audio to an output device configured to output the video and the audio.

15. The method of claim 9, wherein the configuration information further indicates a type of information to be included in the data.

16. A non-transitory computer-readable recording medium having recorded thereon a program for executing the method of claim 9 on a computer.

17. The method of claim 9, further comprising one of:
receiving a user input of selecting the broadcast channel through a user input interface of the electronic device, or
receiving, by the at least one processor, a control signal indicating the broadcast channel from a control device external to the electronic device.

* * * * *